United States Patent
Dudragne

[11] 3,770,342
[45] Nov. 6, 1973

[54] DEVICE FOR LIGHTING AND EXAMINING A CAVITY

[76] Inventor: Raymond Andre Dudragne, 152 Boulevard Haussmann, Paris, 8E, France

[22] Filed: May 1, 1972

[21] Appl. No.: 249,238

[30] Foreign Application Priority Data
May 7, 1971 France .............................. 7116725
May 7, 1971 France .............................. 7116726
Jan. 24, 1972 France .............................. 7202168

[52] U.S. Cl. ...................... 351/7, 350/96 B, 351/1, 351/16
[51] Int. Cl. ........ A61b 3/10, A61b 3/14, G02b 5/16
[58] Field of Search .......................... 351/1, 6, 7, 16; 350/96 B

[56] References Cited
UNITED STATES PATENTS
3,630,602  12/1971  Herbert .............................. 350/96 B
3,664,730  5/1972  Cardona .............................. 351/16

FOREIGN PATENTS OR APPLICATIONS
1,188,326  3/1965  Germany .............................. 351/6

*Primary Examiner*—David Schonberg
*Assistant Examiner*—Paul A. Sacher
*Attorney*—Karl W. Flocks

[57] ABSTRACT

A device for examining the inside of a cavity and, more particularly, for viewing or photographing the retina comprising a plurality of optical fibres cooperating with a light source, and an optical system forming an image of the cavity lit by the optical fibres.

In this device, the optical fibres are mounted along the generating lines of a frusto-conical support, with their transmitting ends distributed over the smaller base of the support, whereas the lens of the optical system are mounted within the support, at right angles to the axis thereof.

5 Claims, 6 Drawing Figures

DEVICE FOR LIGHTING AND EXAMINING A CAVITY

This invention relates to the examination of the inside of a cavity.

Its subject is a device with peripheral lighting suitable to illuminate a large field viewed by means of an optical system without deformation of the image.

A particularly useful, but non-limiting, application of an objective of this king is in the viewing of the retina. Standard ophthalmoscopes work by autocollimation and their system of ocular lighting usually put forward to remedy this disadvantage involve a reduction of the field of view, which reduction is the greater because it is wished to avoid the distortions and aberrations which impair the quality of the image viewed.

The applicant's French Pat. No. 1,583,436 for : "Ophthalmoscope With Light Conductor," a lighting system is described which is chiefly characterized by a plurality of optical fibres the transmitting ends of which are in direct optical contact with the cornea of the patient's eye, all around the pupil.

In accordance with a preferred mode of execution, said transmitting ends rest on a contact lens and are engaged in a spherical wall of a cover which simply acts as a device for bringing and supporting the optical fibres, said cover having a toric portion, hollowed out in such a way as to enable it to rest on the eye, extended by a sleeve through which said optical fibres pass in a bundle.

For viewing or photographing the retina, a more or less complex optical system is associated with a lighting system of this kind.

In some cases, it would be useful for parts of this optical system to be able to be in the immediate vicinity or even in contact with the cornea, which does not easily allow for the presence of the toric cover mentioned above. The latter is, moreover, comparatively difficult to make.

The invention proposes to remedy these disadvantages. In accordance with a preferred mode of execution, the terminal portions of the optical fibres are mounted on the periphery of a hollow adapter, generally cylindrical in shape, or preferably truncate, the internal housing comprised in this adapter making it possible to fix therein the elements of the optical system which have to be in the vicinity of the cornea. In a more particular form of execution, there are mounted in said housing at least a first spherical and divergent lens with a curvature substantially the same as that of the cornea of the human eye and with a high index, said lens being mounted in the vicinity of the small base of the adapter, and at least one lens with a surface calculated to correct a stigmatism and distortion of the objective.

When the retina is thus lit by means of optical fibres, through the cornea and the crystalline lens of the eye, with these fibres at a certain inclination, a superficial diffusion is noted which has a tendency to "wash" the final image with, as a result, a loss of contrast. This is notably the result of the fact that the crystalline lens of the eye may be slightly diffusive, either because of a Thyndal effect or because of slight opacity due to the age of the patient or an incipient cataract.

To remedy this disadvantage, the present invention proposes to fit the lighting end of each of the fibres of the lighting device with a lens or a convergent optical system.

In accordance with a preferred mode of execution, the optical fibres are not all at the same inclination (i.e. are not all oriented along the generators of the same cone).

The inclination of each fibre and the position and strength of each lens can then be calculated so that, on the one hand, the portion of the inside of the cavity which it is wished to light is lit homogeneously at the maximum angle and, on the other hand, the light beams converge on a circumference situated in the vicinity of the aperture of the cavity to be lit — more specifically in cases where the eye is involved — of the pupil thereof.

In accordance with another, simplified mode of execution, the invention proposes a particularly simple device, whose field of view is nevertheless larger than that of most commercial instruments.

In accordance with the invention, this device is basically made up of a contact lens comprising cylindrical perforations in which are introduced the terminations of the optical fibres, which are thus level with the inside surface of said lens, said perforations being uniformly distributed around the optical axis of the contact lens and inclined to said axis at an angle of between 20° and 30° and, preferably, between 22° and 28°.

A better understanding of the invention will be obtained from the following description.

Figure 1:
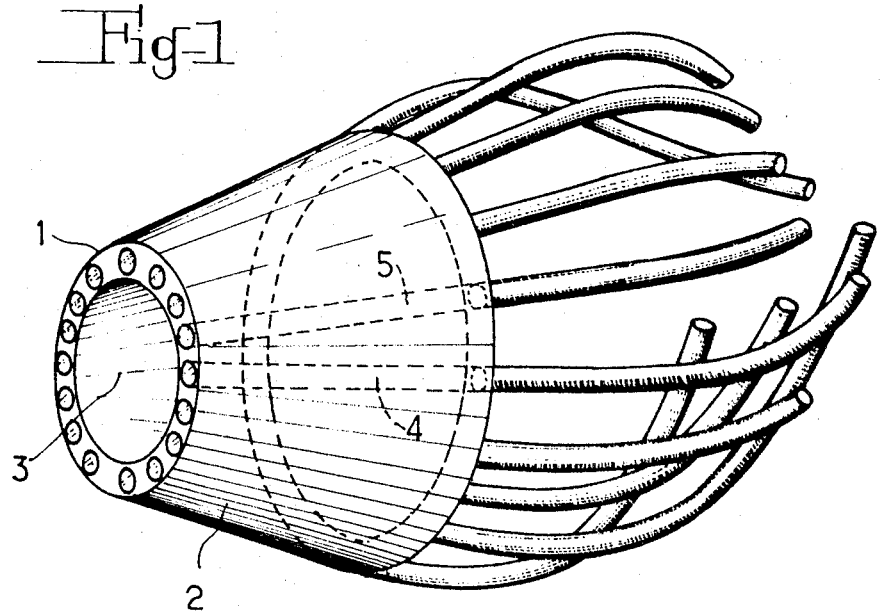
FIG. 1 is a perspective view of an adapter supporting optical fibres in accordance with a first mode of embodiment of the invention.

The adapter shown in FIG. 1 is in the shape of a truncate crown with smooth walls, of which the small base can be seen at 1 and the large base at 2, annular in shape. The cavity delimited by the inside wall of this crown makes it possible to house the lenses, not shown, of the objective in FIG. 3. These lenses are fixed there, by known means, so that their axis coincides with that of the adapter.

The end 3 of this cavity has, e.g., a diameter of 7.8 mm., while the diameter of the outer circle of the small base is, e.g., 10.5 mm. The result is that when the adapter is placed in contact with the cornea so that its axis coincides substantially with the optical axis of the eye, the ring of light formed by the terminations of the optical fibres will send light on to the periphery of the pupil, dilated beforehand. Moreover, the diameter of the contact lens comprised in the objective will be sufficient (7.8 mm in the example under consideration) to take the maximum field of view of the back of the eye.

The truncate crown is made of metal or plastics and is perfectly watertight, as is the join between the forward surface of the contact lens and the small base of the crown, so that the lacrimal liquid cannot penetrate inside the objective.

A certain number of optical fibres have their terminal portions (such as 4 and 5) housed in cylindrical cavities provided in the crown.

Sixteen optical fibres have been shown in FIG. 1, as a non-limiting example.

It can be seen that the optical fibres are uniformly distributed along the generators of a cone.

Experience has shown that this cone should have a demi-angle at the apex of about 25° (± 3° or, at the most, ± 5°).

In practice, the precise angle of inclination of the fibres to the optical axis is selected, in each case, as a function of the type of optical fibres used, their diameter and the divergence of the light beam coming therefrom. This beam generally covers a solid angle of 70°, so that the system lights the back of the eye homogeneously at a solid ang'e of approximately 140°.

Figure 3:
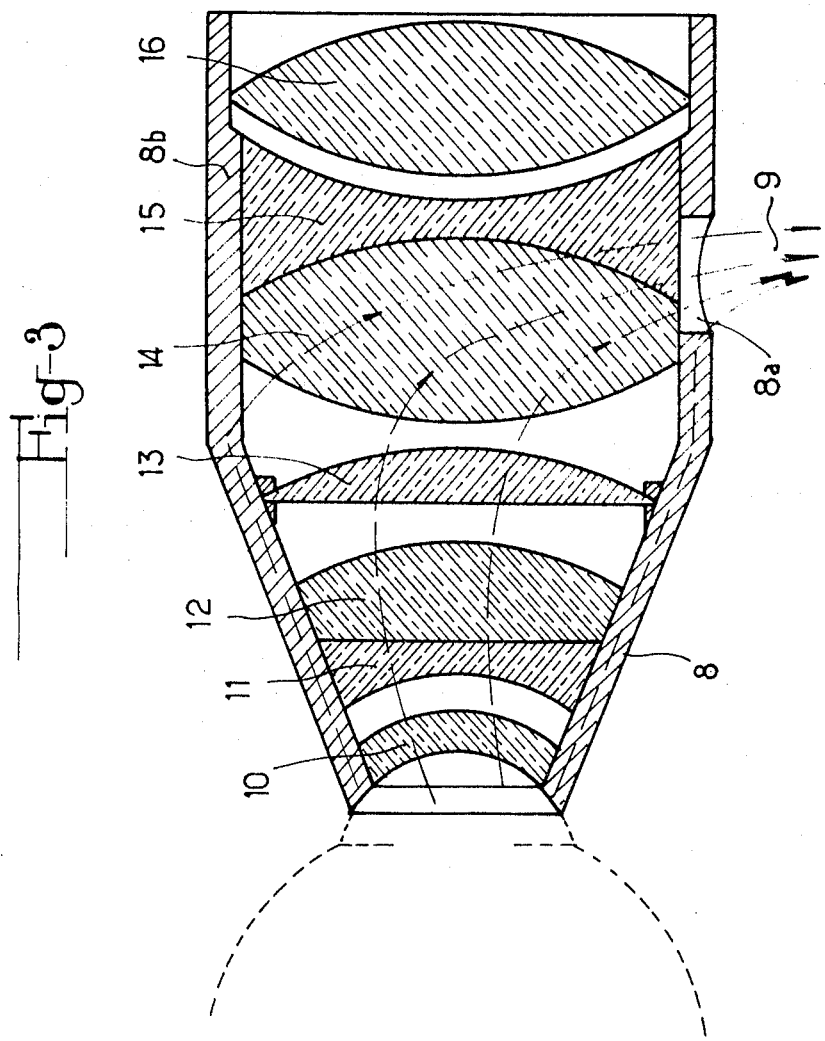
FIG. 3 is a diagram of a preferred mode of execution of the objective contained in said adapter.

The choice of this angle of inclination of the optical fibres makes it possible to avoid the shadows and losses of contrast which would result from poor juxtaposition of the respective light cones emitted by the various fibres.

beyond the large base 2, the fibres assemble (in a way not shown) into a bundle which ends at the source or sources of light, e.g. as shown at 9 in FIG. 3.

Figure 2:
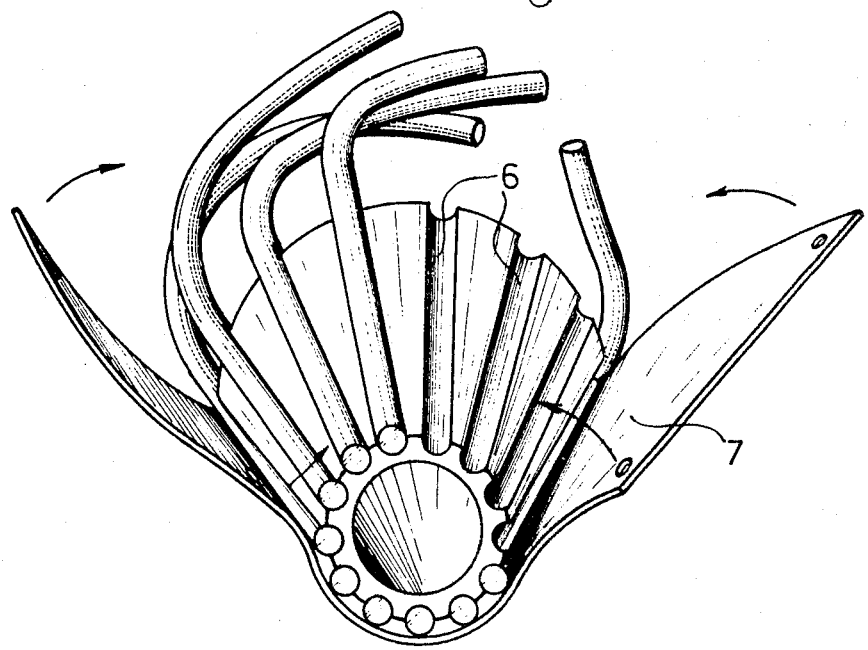
FIG. 2 shows, in perspective, a variation in execution.

In the variation in FIG. 2, instead of using a solid truncate crown with smooth walls, a crown is made of which only the inside wall is smooth. The outside wall has semi-cylindrical hollows along its generators, such as 6.

After the optical fibres have been placed in these hollows, they are covered with a sheet 7 fixed by sticking. This variation is easier to make.

FIG. 3 shows an objective mounted in the adapter described above, which is shown at 8.

It can be seen that the optical fibres (some of which have been shown in dotted lines) comme out through a hole 8a made in the adapter, in order to assemble in a bundle 9, as mentioned above.

The crown which incorporates the optical fibres is here extended by a portion 8b which is used solely to fix the lenses.

A first divergent spherical lens 10 comes practically into contact with the eye. Its radius of curvature is, for this purpose, close to the average radius of curvature of the cornea (8 mm.)

As mentionned above, its diameter (e.g. 7.8 mm) is sufficient for it to take the maximum of the field of view and, for the same reason, its index is high (e.g. 1.68).

At this lens is mechanically connected to the objective unit, the movements of the eye being viewed have no effect on it.

Of course, this divergent lens has to be followed by a unit (11 to 16) which gradually directs the rays towards the optical axis in order to form, from the spherical surfaces of the retina, the true plane image of a size suitable to be taken up by an optical system positioned downstream and used for viewing, photography, etc.

This unit is designed, on the one hand gradually to correct the aberrations introduced by the lens 10, and on the other hand so that the focal distance of the objective is close to that of the eye (between 15 and 16 mm), finally so that the objective is corrected for an anterior diaphragm (constituted by the entry pupil of the eye being viewed).

These properties of the objective are, in practice, very important. Due to the fact that the focal distance of the objective is close to that of the eye, the distortion and the curvature of the field introduced by viewing a large spherical surface can be corrected and, moreover, there is a considerable depth of axial field: adjustments will be very slight, between 20 cm and infinity.

The fact that the correction of the aberrations is obtained by making the main light rays pass through the centre of the entry pupil of the eye being viewed gives maximum astigmatism, chromatism and curvature of field.

The use of at least one non-spherical lens allows the maximum field to be obtained.

In the preferred mode of execution described, a first set of lenses 11 and 12 forms a convergent system with a high index. Calculation thas shown that a plane separating surface between 11 and 12 improves the chromatic quality of the image without having any effect on the field.

The plane-convex lens 13 preferably has a parabolic surface, its plane surface being turned towards the patient's eye. The lenses 14–15 complete the process of making the light beams converge towards the image plane, the lens 16 acting as a field lens. This latter lens is calculated, as a function of the use envisaged, to make the light beam converge towards the entry pupil of the optical system positioned downstream, so that it can collect all the light coming from the eye being viewed. Moreover, the surface of it which is turned towards the downstream optical system is preferably non-spherical (e.g. parabolic). This field lens can be split up into several components according to the type of viewing system positioned behind the objective.

Figure 4:
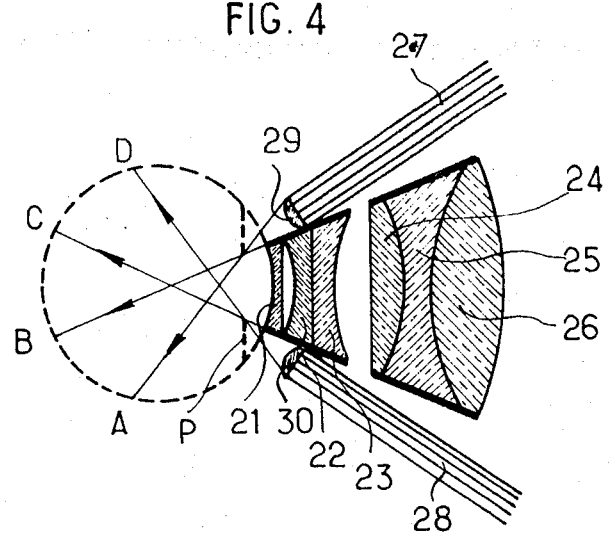
FIG. 4 is a partial, axial section view of an ophthalmoscopic instrument applying the lighting device in accordance with the invention.

In all cases, the field viewed by the complete instrument which contains the objective described above can be of the order of 110° to 130° with very good definition of the image. FIG. 4 shows a device for lighting and examining an eye, represented in dotted lines with its pupil P. This device comprises an optical system for examination (lenses 21 to 26) mounted inside a support (not shown) which is roughly in the shape of a truncate crown.

A certain number of optical fibres, such as 27–28, have their terminal portions housed in cavities made in the outside wall of this crown. These fibres cooperate, at their other end, wich is not shown, with a light source and direct light beams towards the pupil P. A certain portion ABCD of the retina is thus lit, and the optical system 21–26 gives an image of it which can be examined or treated in various ways.

It is known that the light beam supplied by each fibre is more or less divergent.

In the device described, it is made convergent by fixing a convergent lens, such as 29–30, at the transmitting end of each fibre (in practice, this will is reality be a convergent system made up of several lenses).

Figure 5:
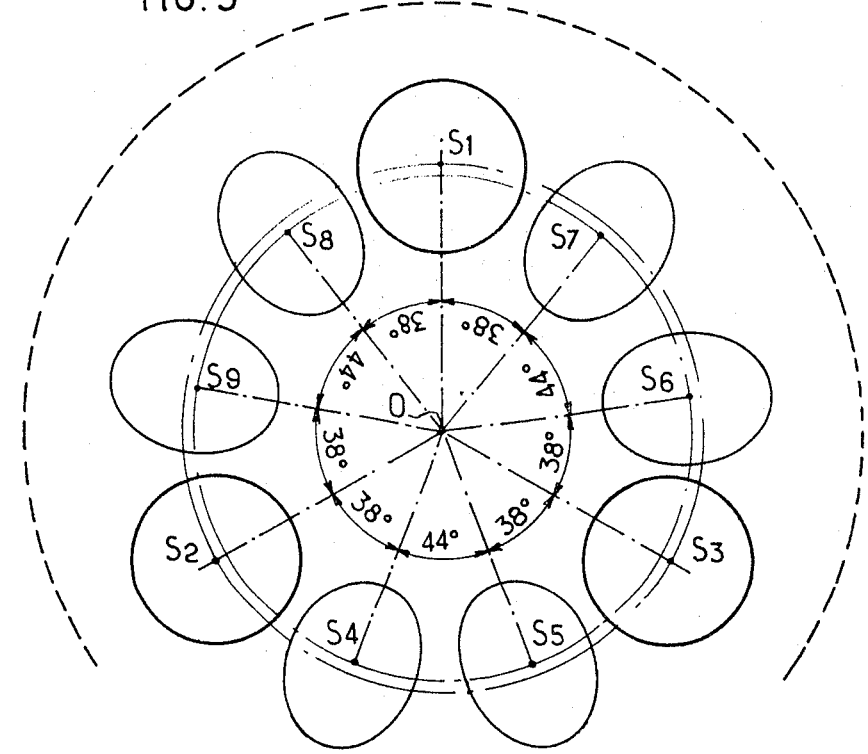
FIG. 5 is a plane view of the positioning of the convergent lenses.

In FIG. 5, two concentric circles in dotted lines represent, on the one hand the position of the points of convergence of the various lighting signals, and on the other hand the projection of the contour of the eye in a plane perpendicular to its axis.

The convergent lenses are preferably positioned in crown form. as shown in this figure, where, as an example, nine lenses have been shown whose optical axes project at $S_1$ to $S_9$, indicating the angles $S_1 \, OS_7$, $S_7 OS_6$, etc.

The planes of the lenses $S_1$, $S_2$ and $S_3$ are perpendicular to the planes defined by the axis of the eye and by OS₁, OS₂ and OS₃ respectively. They form e.g. an angle of 27° with the vertical.

The planes of the lenses S₄ and S₉ are, e.g. inclined at 31° form the vertical and 24° from the horizontal plane passing through the axis of the eye.

These inclinations, given as examples, make it possible to light up the retina homogeneously with an angle of aperture of about 100°.

The beams coming from the fibres converge to form a series of light spots positioned in a circle on the edge of the pupil. Arrangements can be made for the image of this circle given by the optical viewing system to be outside the surface of the image of the retina and thus not disturb this latter image. The convergent systems are calculated so that the spots are as small as possible; this will thus give the minimum of diffusion on the crystalline lens of the eye and the rays reflected on the crystalline lens of the eye will practically not penetrate into the optical viewing system.

It will be noted that the lighting system described does not touch the eye.

It goes without saying that various applications of this system can be envisaged.

The variable inclination of the axis of the optical fibres is a function of the type of surface to be explored, its extent, its shape and its depth. This is one of the advantages of the system, that it allows the orientations of the beams to be adjusted.

Figure 6:
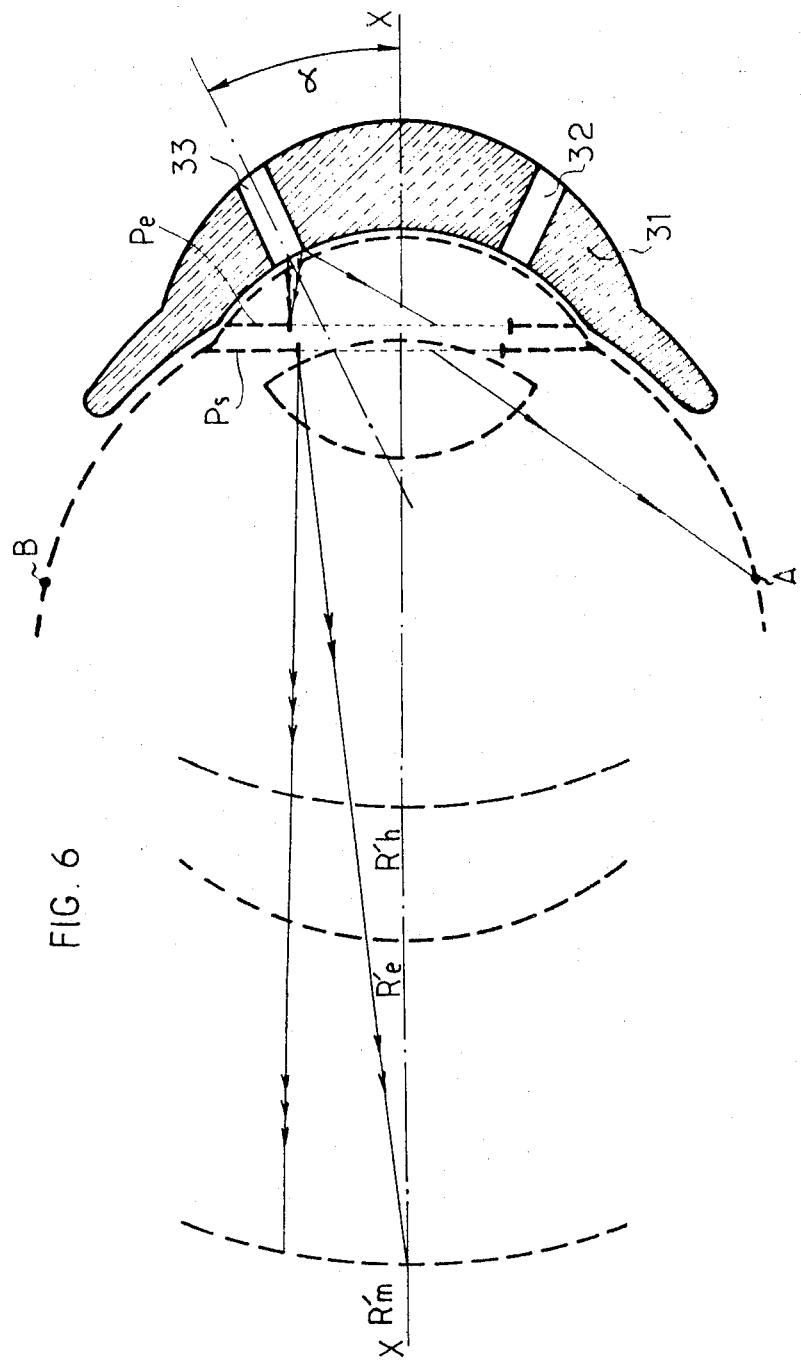
FIG. 6 is an enlarged view of a contact lens in accordance with the invention.

FIG. 6 shows, in axial section, a contact lens 31 with six or eight cylindrical perforations of which only two (32 and 33) can be seen in the drawing. These perforations are uniformly distributed around the axis X'X common to the contact lens and to the patient's eye (shown in dotted lines). Preferably, their axis is at an angle substantially equal to 25° in relation to the axis x'X. The precise angle is selected, in each case, between 20° and 30° or, better still, between 22° and 28°, as a funcion of the type of optical fibres used. The latter, not shown, are introduced into the perforations so that their transmitting ends are on a level with the inside surface of the lens in contact with the cornea C. They are assembled, in a way not shown, into a bundle which ends, at the other end of the fibres, at a light source. Of course, the bundle is formed and positioned in such a way as to leave completely free the viewing cone with an angle at the apex slightly less than 2α, shown in FIG. 6. At Pe and Ps respectively, the entry pupil and the exit pupil of the eye have been shown, at R'e the point where the axis X'X intersects the retina of an emmetropic eye and at R'h the corresponding point in the case of a hyperopic eye. In the case of a myopic eye, the corresponding point would be situated to the left of R'e.

The optical fibre introduced at 33 emits light waves at a solid angle of about 70°. A dotted line with double arrows represents the rays emitted by the centre of the emitting end, and a dotted line with single arrows represents one of the outer rays emitted by the bottom edge of this emitting end (it intersects the back of the eye at A) and a dotted line with triple arrows represents the other outer ray emitted by said bottom edge.

It is clear that the whole of the surface defined by the revolution of the arc AR'eB (either AR'hB or AR'nB, B being symmetrical with A in relation the axis X'X) will be uniformly lit by the cones delimited by the two rays coming from the bottom edge of the optical fibres, even in the most unfavourable case of myopia (since the ray with the double arrows ends at R'm).

The centre region of the retina will receive slight supplementary lighting coming from rays such as the one with the triple arrows. This slight overlap of beams, obtained by suitable inclination of the optical fibres, as indicated above, ensures that there is no area of shadow in this centre region, the arc AR'mB defines a cone with an aperture of approximately 140°.

In practice, the shape of the contact lens can be adapted to the cases under observation.

I claim:

1. Device for examining an eye fundus, comprising a plurality of optical fibres the transmitting ends of which are positioned in such a way as to distribute their light beams in order to pass through the pupil and illuminate the eye fundus and an optical system suitable to form an image of the eye fundus thus lit, said device comprising means for supporting the optical fibres arranged with the general shape of a conical crown having a semi-angle at the apex comprised between 20° and 30° and along which the terminations of the optical fibres are positioned, the transmitting ends of said fibres being distributed over the smaller base of the crown, said supporting means having, fixed perpendicularly to its axis, at least one lens situated in the immediate vicinity of said smaller base, the inside diameter of said smaller base and the diameter of the said lens being comprised between 7 and 8 mm, said smaller base being adapted to be placed in contact with the cornea.

2. Device in accordance with claim 1, wherein the said lens is divergent and spherical, the radius of curvature of the surface thereof which is nearest to the said smaller base being substantially equal to that of the cornea of the human eye.

3. Device in accordance with claim 1, characterized in that said optical system has a focal distance close to that of the human eye and is corrected for an anterior diaphragm.

4. Device in accordance with claim 1, wherein a convergent optical system is fixed to each of said fibre transmitting ends, said convergent optical system being adapted for making the light beam transmitted by the optical fibre substantially convergent along a circle having substantially the same diameter as that of the pupil of the human eye.

5. Device in accordance with claim 1, wherein the said semi-angle is about 25°.

* * * * *

Notice of Adverse Decision in Interference

In Interference No. 98,755, involving Patent No. 3,770,342, R.A. Dudragne, DEVICE FOR LIGHTING AND EXAMINING A CAVITY, final judgment adverse to the patentee was rendered Jan. 13, 1977, as to claims 1, 2 and 3.

[*Official Gazette May 3, 1977.*]